United States Patent [19]

Ingoglia et al.

[11] Patent Number: 5,214,780
[45] Date of Patent: May 25, 1993

[54] SYNCHRONIZED JOURNALING SYSTEM

[75] Inventors: Joseph P. Ingoglia, San Jose; Nayeem Islam, Mountain View, both of Calif.

[73] Assignee: Sun Microsystems, Inc., Mountain View, Calif.

[21] Appl. No.: 498,206

[22] Filed: Mar. 23, 1990

[51] Int. Cl.$^5$ .................. G06F 15/40; G06F 7/00; G06F 9/40; G06F 15/18
[52] U.S. Cl. .................. 395/600; 364/DIG. 1; 364/DIG. 2; 395/575
[58] Field of Search .................. 395/600, 575; 364/200

[56] References Cited

U.S. PATENT DOCUMENTS

| | | | |
|---|---|---|---|
| 4,816,989 | 3/1989 | Finn et al. | 364/200 |
| 4,980,824 | 12/1990 | Tulpule et al. | 364/200 |
| 5,086,386 | 2/1992 | Islam | 395/600 |
| 5,157,779 | 10/1992 | Washburn et al. | 395/575 |

FOREIGN PATENT DOCUMENTS 0062978 10/1982 European Pat. Off. .
0240663 10/1987 European Pat. Off. .
2217070A 10/1989 United Kingdom .

Primary Examiner—Thomas C. Lee
Assistant Examiner—Wayne Amsbury
Attorney, Agent, or Firm—Blakely Sokoloff Taylor & Zafman

[57] ABSTRACT

In the system of the present invention, an event driven journaling mechanism which is not dependent on the timing of execution of processes is implemented. Special events, referred to as synchronization events, mark locations, referred to as synchronization points, in the journal file of events where previously initiated processing must be completed before initiating the subsequent process. The synchronization points are located between processes which are exchanging state. The synchronization events are put into the journal file during the recording phase. On playback, the journaling mechanism waits for a synchronization event to occur before proceeding to the next action in the journal file and initiating subsequent execution of the process.

11 Claims, 10 Drawing Sheets

```
0  0      0    0   /SetMapping Root[0]
0  0      0    0   /SetMapping SVJFrame[2]
0  0      0    0   /SetMapping SVJPanel[3]
0  160000 1224 1235 /Move Mouse
0  40000  1188 1209 /Move Mouse
0  60000  1100 1133 /Move Mouse
0  40000  982  1017 /Move Mouse
0  40000  882  885  /Move Mouse
0  40000  806  745  /Move Mouse
0  40000  752  611  /Move Mouse
0  40000  724  497  /Move Mouse
0  40000  704  405  /Move Mouse
0  40000  682  333  /Move Mouse
0  40000  680  289  /Move Mouse           2000
0  40000  680  269  /MoveY Mouse
0  40000  686  261  /Move Mouse           2005
0  40000  692  261  /MoveX Mouse
0  200000 692  261  /DownTransition MS_RIGHT — 2010
0  0      692  261  /Still Mouse
0  10000  692  261  /SyncSet GrabIO[0]
0  70000  692  261  /SyncSet SunViewMenu[0]  2015
0  240000 694  261  /MoveX Mouse
0  0      701  260  /Move Mouse           2020
0  40000  723  260  /MoveX Mouse
0  40000  743  258  /Move Mouse
0  40000  755  254  /Move Mouse
0  40000  759  254  /MoveX Mouse
0  100000 763  254  /MoveX Mouse
0  100000 773  256  /Move Mouse
0  40000  783  258  /Move Mouse
0  40000  797  258  /MoveX Mouse
0  40000  803  258  /MoveX Mouse
0  10000  803  258  /SyncSet SunViewMenu[0]
0  50000  811  258  /MoveX Mouse
0  40000  823  258  /MoveX Mouse
0  40000  839  262  /Move Mouse
0  40000  853  270  /Move Mouse
0  80000  857  278  /Move Mouse
0  40000  859  290  /Move Mouse
0  40000  859  300  /MoveY Mouse
0  40000  859  302  /MoveY Mouse
0  160000 859  308  /MoveY Mouse
0  40000  859  310  /MoveY Mouse
0  200000 859  310  /Still Mouse
0  240000 859  310  /UpTransition MS_RIGHT
```

Fig. 8

SYNCHRONIZED JOURNALING SYSTEM

BACKGROUND OF THE INVENTION

1. Field of the Invention

The system of the present invention is related to the field of automated testing of computer systems and computer software. Specifically, the system of the present invention relates to the field of automated testing of window-based systems.

2. Background of the Invention

To test computer system hardware and software, a script of user actions is developed which reflect actions taken by a user during a typical user session. An action may be, for example, moving the cursor, typing information, or depressing a button on the mouse. The actions listed in the script are manually entered into the computer system and the results output by the computer system are analyzed to determine if the system performed as expected. Running controlled tests in this manner is difficult. Each time the script is run, the test itself may be different because it is hard to replicate the user actions precisely. In addition, some test results are hard to compare by visual examination. For example, it is very difficult to compare screen images to determine pixel accuracy.

A method that has been used for testing software is a record and playback mechanism known as journaling. Journaling is the process of recording a series of user actions reflected in the system as "events," storing them in a file, often referred to as a journal file, and replaying the recorded event to simulate a user session by causing the system to re-execute the recorded events representative of the user actions. (See for example, *CAPBAK-/UNIX Terminal Session Capture and Playback for UNIX Systems*, Software Research Inc., (1989). The journaling systems typically addressed a single input device, i.e. the keyboard, which provided input to a single process and does not perform adequately in a multi-input, multi-process environment.

In a window-based computer system, such as those marketed by Sun Microsystems, Inc., Mountain View, Calif., a user may interact, through a variety of input devices, with a plurality of applications concurrently operating in a plurality of windows on a display. Window-based systems introduced added complexity to the journaling process. In a window-based system, a number of input devices and a number of processes interact with one another in a predetermined sequence in order to produce a desired effect such as selecting a client or application process from a menu or moving the cursor from one window to another. In an attempt to maintain a proper sequence, a time delay is inserted between various actions recorded in the journal file to increase the amount of time between execution of actions. By scaling the time between events, it is generally possible to maintain the proper execution sequence of actions taken by the input devices and processes. However, playing actions faster than the speed they were initially recorded, as is done typically on playback of a journal file, can lead to unexpected behavior. This unexpected behavior arises because of race conditions caused by a second process executing prior to the completion of execution of a first process, wherein the final state of the first process is utilized by the second process.

SUMMARY OF THE INVENTION

It is an object of the present invention to provide a system of journaling which is event-driven and not time-dependent.

It is further an object of the present invention to provide a system of journaling that provides a means for accurately testing a window system.

It is an object of the present invention to provide a system which allows the testing of a user interface across different hardware architectures without modifying the testing procedure.

In the system of the present invention, an event driven journaling mechanism which is not dependent on the timing of execution of processes is implemented. Special events, referred to as synchronization events, mark locations, referred to as synchronization points, in the journal file of events where previously initiated processing must be completed before initiating the subsequent process. The synchronization points are located between processes which are exchanging state. The synchronization events are put into the journal file during the recording phase. On playback, the journaling mechanism waits for a synchronization event to occur before proceeding to the next action in the journal file and initiating subsequent execution of the process.

BRIEF DESCRIPTION OF THE DRAWINGS

The objects, features, and advantages of the present invention will be apparent from the following description of the invention in which:

FIG. 8 is an illustrative journal file in ASCII text format.

DETAILED DESCRIPTION OF THE INVENTION

Notation And Nomenclature

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. it proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method of operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

General System Configuration

Figure 1:
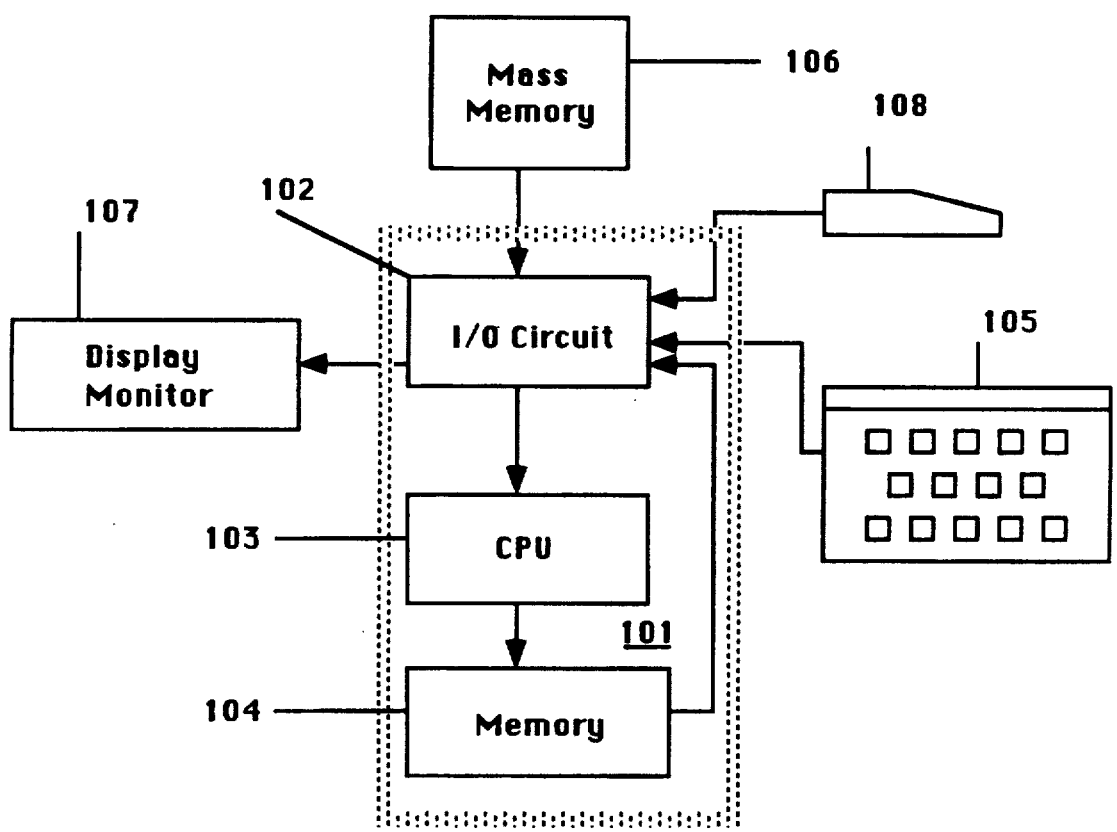
FIG. 1 is a typical computer based system for implementing the synchronized journaling mechanism of the present invention.
Figure 2:
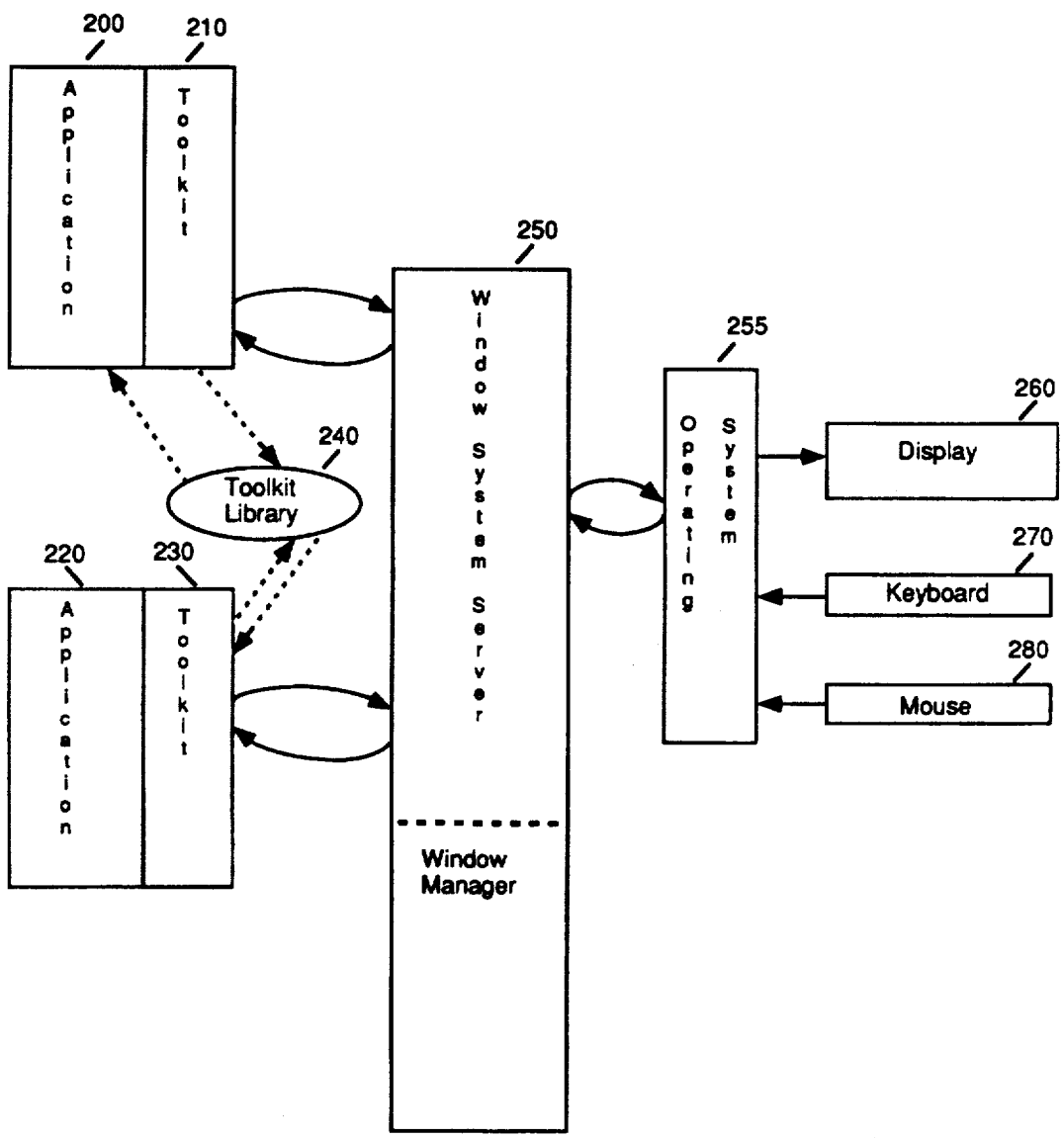
FIG. 2 is a block diagram representation of a server-based window system.

FIG. 1 shows a typical computer-based system for performing synchronized journaling according to the present invention. Shown there is a computer 101 which comprises three major components. The first of these is the input/output (I/O) circuit 102 which is used to communicate information in appropriately structured form to and from the other parts of the computer 101. Also shown as a part of computer 101 is the central processing unit (CPU) 103 and memory 104. These latter two elements are those typically found in most general purpose computers and almost all special purpose computers. In fact, the several elements contained within computer 101 are intended to be representative of this broad category of data processors. Particular examples of suitable data processors to fill the role of computer 101 include machines manufactured by Sun Microsystems, Inc.; Mountain View, Calif. Other computers having like capabilities may of course be adapted in a straightforward manner to perform the functions described below.

Also shown in FIG. 1 is an input device 105, shown in typical embodiment as a keyboard. It should be understood, however, that the input device may actually be a card reader, magnetic or paper tape reader, or other well-known input device (including, of course, another computer). A mass memory device 106 is coupled to the I/O circuit 102 and provides additional storage capability for the computer 101. The mass memeory may include other programs and the like and may take the form of a magnetic or paper tape reader or other well known device. It will be appreciated that the data retained within mass memory 106, may, in appropriate cases, be incorporated in standard fashion into computer 101 as part of memory 104.

In addition, a display monitor 107 is illustrated which is used to display messages or other communications to the user. Such a display monitor may take the form of any of several well-known varieties of CRT displays. A cursor control 108 is used to select command modes and edit the input data, and in general provides a more convenient means to input information into the system.

Process Description

The following description of the preferred embodiments describes the synchronized journaling mechanism of the present invention operating in a window system environment. Specifically, the implementation of the synchronized journaling mechanism of the present invention is described with respect to a distributed window system environment (also referred to herein as a server-based system) and in a kernal based window system. However, it will be apparent to one skilled in the art, from reading the following detailed description, that the synchronized journaling system of the present invention may be applied to different computer systems having different computer architectures and different window systems as well as non-window-based systems. Furthermore, the following description discusses the synchronized journaling system of the present invention operating in the Unix ® Operating System (Unix is a registered trademark of AT&T); however, the system is not limited as such and may be implemented in any operating system.

Typically, a window system divides the screen into a set of overlapping or nonoverlapping independent visual regions referred to as windows. A window is a visible part of the screen used for display and user interaction. The window system provides applications with procedures to draw on the windows and implements complex user interface features such as menu scrollbars and panels. It also provides applications with the ability to receive events from the input devices connected to the system. Another aspect of window system addresses how windows are positioned on screen. The windows may be either tiled or overlapping. The software that determines the arrangement of windows is called the window manager because it determines how the desktop real estate is managed.

The window system provides a means by which a user can switch between applications operating within the window system. It also provides support for complex applications that utilize multiple windows. There are generally two types of window systems; kernal-based and distributed-based (also referred to as server-based). In a server-based window system, a separate server process mediates access to the display and input devices. In a kernel-based window system, the device driver within the kernel performs these functions.

A server-based window system consists of a number of processes referred to as the window server, window manager and toolkit. The application processes are really client processes which are operated through the window system. The display 260, keyboard 270 and mouse 280 provide input/output to the window system and application processes operating through the window system via the operating system 255. The window server 250 controls the display and mediates access to display by the application process. It also provides a base functionality in terms of windows and cursors and determines how to draw into these windows and how to distribute events to them. Examples of window systems include the X11 TM (X11 is a trademark of the Massachusetts Institute of Technology) which supports the X11 protocol (See Sheifler, Gettys, "The X Windows System":, *ACM Transactions On Graphics*, Vol. 5, No. 2 (April 1986) pp. 79-109) and X11/NeWS TM window system, which is available from Sun Microsystems, Inc., Mountain View, Calif., and supports both the X11 and NeWS TM (NeWS is a trademark of Sun Microsystems, Inc.) window server protocols (See Shaufler, "X11/NeWS Design Overview", *Proceedings of the Summer* 1988 *User Conference*, (1988) pp. 23-35).

The application process 200, 220 is typically linked with a toolkit 210, 230 which implements the user interface functionality and provides the means for the client process to tailor the user interface to the client process. The toolkit determines how the window systems menus look, how users interact with control areas and how control areas are organized. Furthermore, the toolkit provides a programmatic interface that allows developers of the application programs to implement sophisticated windowing applications. The toolkit 210, 230 preferably includes a toolkit library 240 consisting of a library of functions the toolkit references to interface the application to the window system. An example of a toolkit is the XView TM toolkit (XView is a trademark of Sun Microsystems, Inc.) available from Sun Microsystems, Inc. to be used with the X11/NeWS window system. For further information regarding the XView toolkit, see Jacobs, "The XView Toolkit, Architectural Overview", *3rd Annual Technical Conference*, (1989).

The window manager may be a separate process, as is typically the case with the X11 protocol, or it may be part of a window server, as is the case with respect to the X11/NeWS window system where the window manager is a collection of processes that reside in the window server. The window manager controls the workspace, the window that occupies the entire screen and determines the workspace menu window and icon placement.

Figure 3:
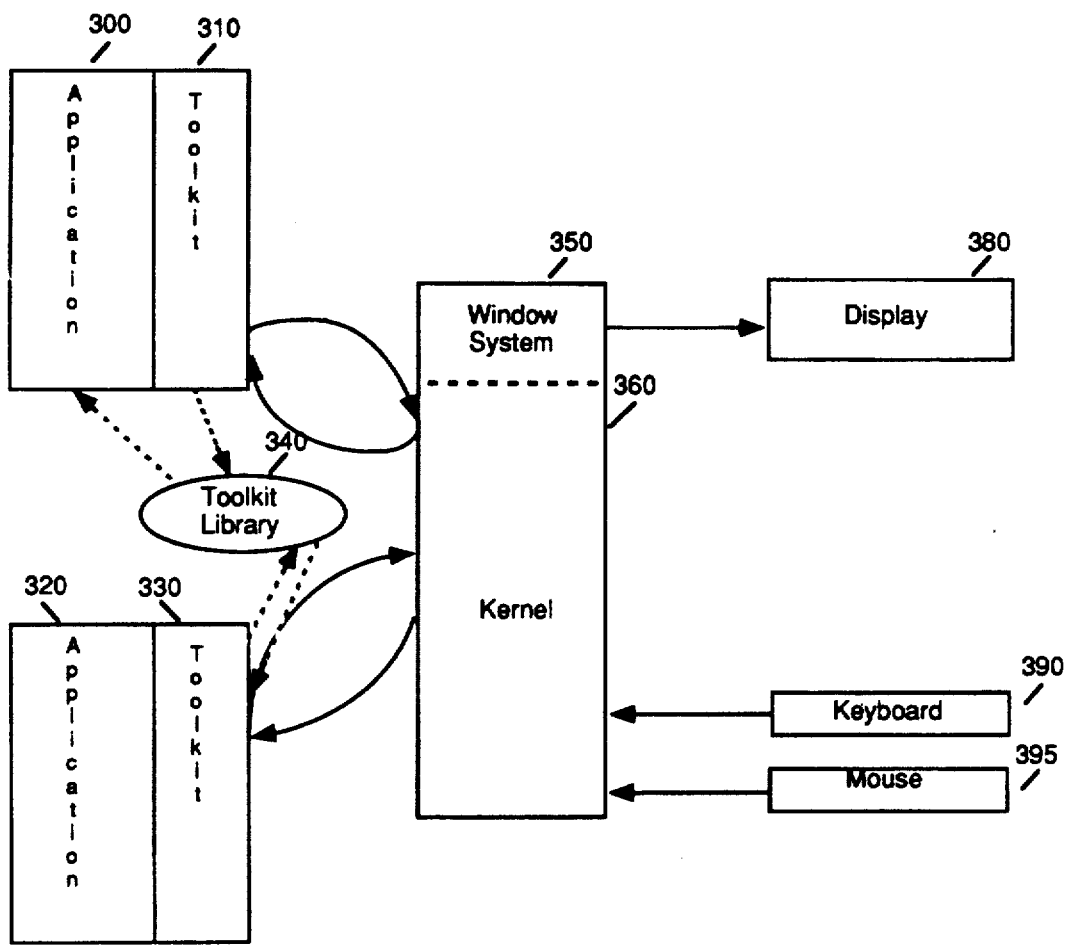
FIG. 3 is a block diagram representation of a kernel-based window system.

A kernel-based window system is described with reference to FIG. 3. In a kernel-based window system, the kernel 360 is modified to consist of an event manager and a means to contain window state information 350. This part of the system is in charge of the input 390, 395 and display 380 devices and of distributing events to the client applications 300, 320. When it is necessary for an application to access devices, the applications 300, 320 make kernel calls. An example of a kernel-based window system is the SunView TM Window System (SunView is a trademark of Sun Microsystems, Inc.; see Sun Microsystems, Inc., *SunView* 1 *Programmer's Guide*, revision A, May 9, 1988 and Sun Microsystems, Inc., *SunView* 1 *Systems Programmer's Guide*, revision A, May 9, 1988.)

The kernel-based window system also consists of a user interface toolkit 310, 330 which provides the applications' menus, control areas and drawing capabilities. Each window is treated as a separate device. The toolkit 310, 330 is linked with the application 300, 320 and the toolkit library 340. An example of a toolkit is in the SunView window system. A kernel-based window system also contains a window manager which resides in the toolkit 310, 330 and in the kernel 360. This is different from a server-based window system in which the window manager is often a separate process. In addition, there is often a selection service process that acts as an intermediary for the transfer of data between applications. Kernel system signals are the primary method used in communication between the window system, applications and the kernel. For example, applications use system calls for locking windows and are sent signals by the window system to indicate that a window has changed. The selection service process and applications communicate using a Remote Procedure call Interface. In a kernel-based window system, all applications are required to execute on the same machine in order to perform window system operations because applications are tied to the system calls as the means of communication.

Figure 4:
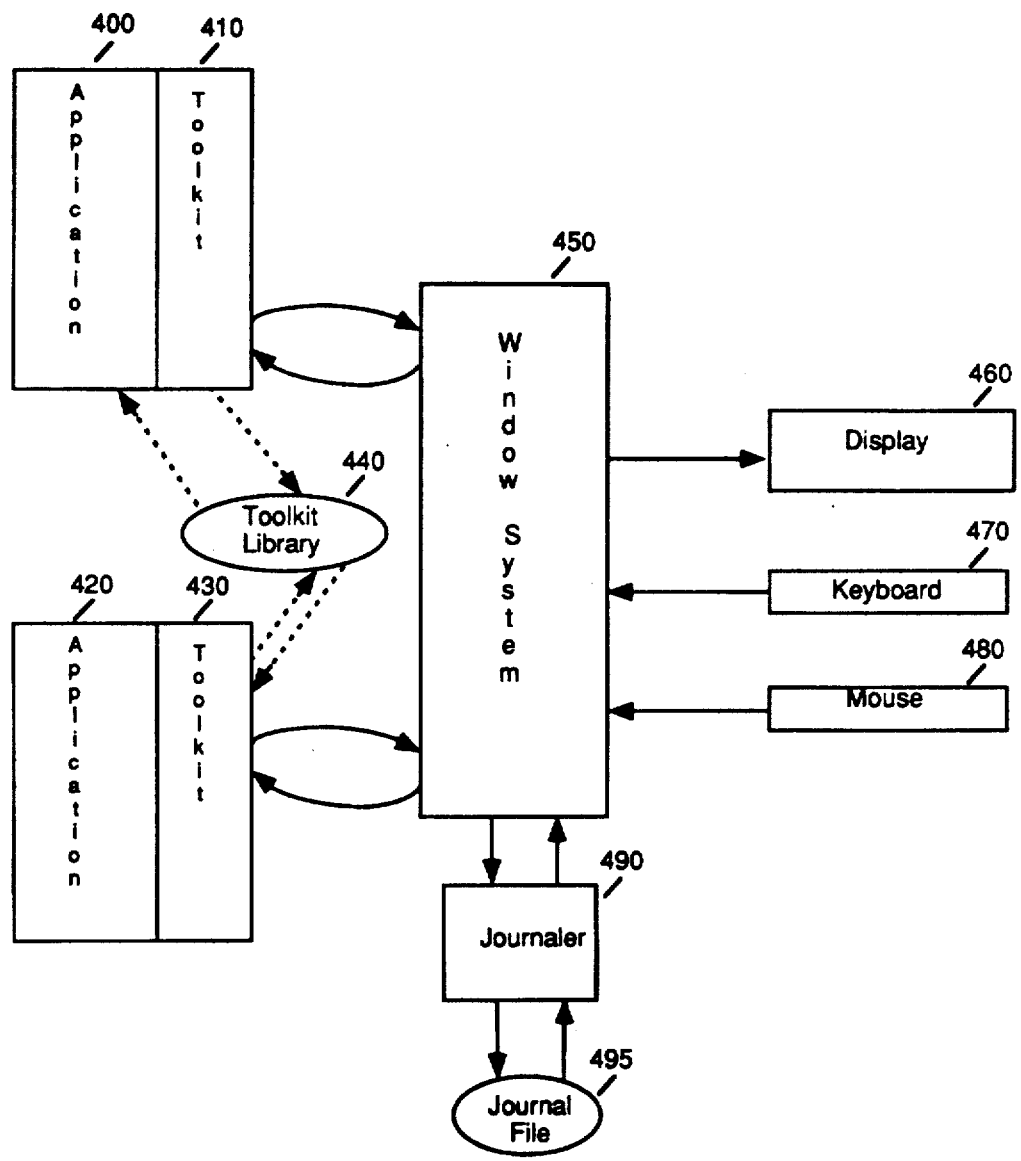
FIG. 4 is a conceptual block diagram of the synchronized journaling mechanism of the present invention.

In the synchronized journaling mechanism of the present invention, the journaling mechanism is made timing independent and therefore avoids unexpected behavior caused by race conditions during playback of the journal file. A conceptual block diagram of the synchronized journaling system of the present invention is illustrated by FIG. 4. A journaler 490 is connected to the window system 450. During "capture," each action performed by the user through the input devices 470, 480 and input into the window system as an event is recorded by the hournaler 490 in a journal file 495 in the order the actions are performed. If the action recorded is one that must be completed before further actions are performed, a synchronization event is placed in the journal file at the location after the event. These locations are referred to as a synchronization points and may be defined as the locations in the journal file where multiple processes are exchanging state. For example, if the actions to be taken are to change the focus of the cursor, that is to move the cursor from one window to another, and input information into the window, either through the keyboard or cursor, it should be assured that the focus has changed to the new window prior to the input or else an error will occur because the input will be directed to the wrong window.

On playback, the journaling mechanism waits for each of the synchronization events to occur before delivering more events from the journal file to the window system for execution. Using these synchronization events, events on playback are delivered and executed in the same order as the events were initially entered by the user without the occurrence of race conditions. In addition, by using this timing independent mechanism and a journal file which is recorded in a widely accepted format, e.g. ASCII, a single script can be used across multiple architectures thereby providing a universal benchmark for multiple architectures.

Synchronization events may be inserted at any location in the journal file where it is desired that an event completes processing before a subsequent event is initiated. It is preferred that synchronization events are inserted between actions which exchange state. Preferably synchronization events are inserted into the journal file with respect to the following actions:

1. A window is mapped and displayed.
2. A window is unmapped and removed from the display.
3. An active grab of an object occurs. (An active grab occurs when an application requests and receives all events regardless of the window/process the event is directed to.)
4. An active grab is released.
5. A Mouse device is mapped (i.e., an application moves the mouse).
6. A menu is mapped to the display.
7. A menu is unmapped from the display.
8. Terminal emulator prompting (when a window is set to operate like an ASCII terminal).
9. A change of input focus from one window to another.
10. An application specific synchronization point.

The synchronization events may be internal to the server or kernel and generated independently of the toolkit and application code. Alternatively, the synchronization events may be generated by the application or toolkit code. The application-independent method is attractive because the toolkit and application code does not need to be modified in order to implement synchronized journaling. However, more events may have to be recorded in the journal file leading to degradation of the system performance. This due to the use of indirect secondary states changes which are synchronized in order to best synchronize a primary state change which the server or kernel cannot directly synchronize. In the application-dependent method, the application and/or toolkit code must be modified to provide for journaling. However, additional application-specific synchronization events to handle special user interface features such as button click-to-type are easily accommodated. Alternatively, a hybrid approach may be used in which the journaling is implemented as a combination of the two methods by providing the flexibility of the application-dependent method and the efficiency of the application-independent method.

The synchronization points can be determined by the user and manually entered into the journal file or can be generated automatically by the window system or journal mechanism during the capture of user actions and generation of the journal file. Preferably, the synchronization points are automatically determined according to the events representative of the actions performed. Thus, during capture, each event representative of the action performed by the user will be reviewed to determine if a synchronization event is required. If a synchronization event is required, one is automatically inserted into the journal file such that on playback the processing relevant to the event synchronized is completed before initiating subsequent events listed in the journal file.

Figure 5A:
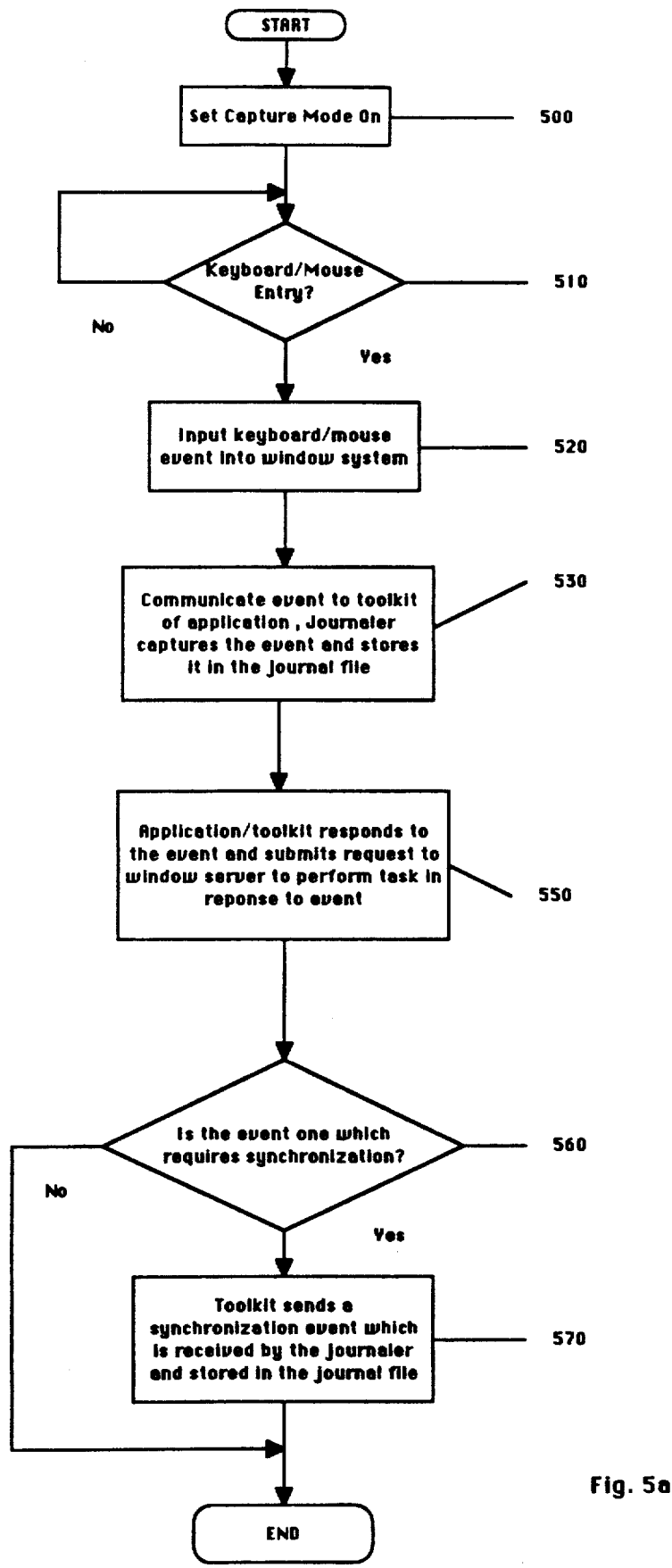
FIGS. 5a and 5b are flowcharts which illustrate the synchronized journaling process of the present invention.
Figure 5B:
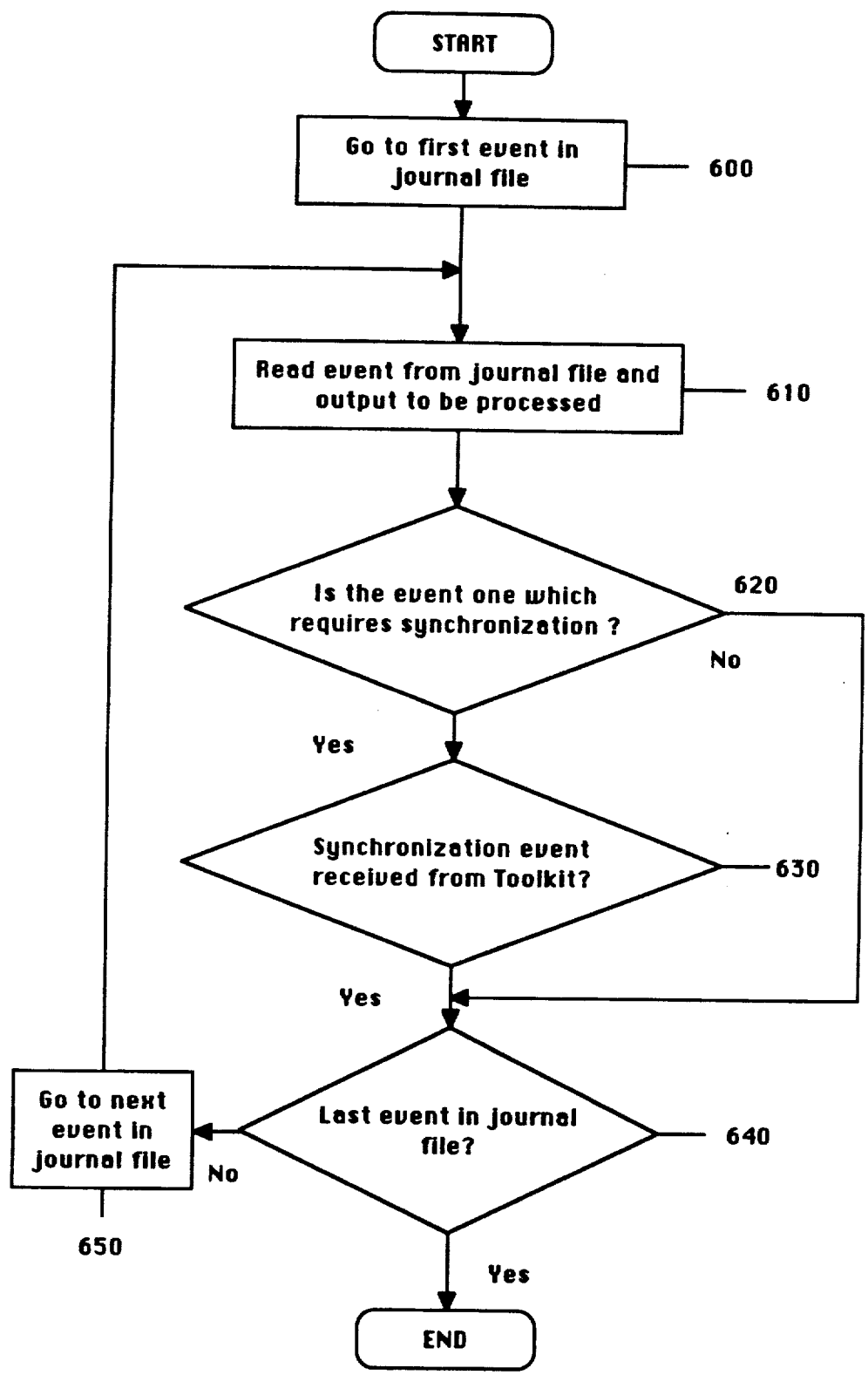

The preferred automated process is described referring to the flowcharts of FIGS. 5a and 5b. At block 500, the capture mode is set to be on, such that user actions are recorded in the journal file for subsequent playback. At block 510, the system waits for an event to occur (i.e. when the user inputs information through the keyboard or mouse). The event is received and input to window system (block 520). After receipt of the event from the input mouse or keyboard, the window system, at block 530, communicates the event to the toolkit of the application, which is currently active in the particular window the information was input into. At the same time, the journaler "captures" the event and stores it in the journal file. For example, in the X11/NeWS Window System, it is preferred that the journaler "captures" the event by "expressing an interest" in all events. (See, Shaufler, "X11/NeWS Design Overview", *Proceedings of the Summer* 1988 *User Conference*, (1988) pp. 23-35). By expressing an interest in all events the journaler receives copies of all events generated. Preferably, the structure of the event information that is kept is as follows: Time stamp XY, key date, name of event. Alternatively, the event information may also contain an identification of the window process the action was entered into. The time stamp field records the time when the event occured. The XY fields record the coordinates of the event. The key state field represents the state of the keys for the keystrokes and mouse events and the name of the event field stores the name of the event or events which requires synchronization. Preferably, the events representative of actions to be performed which are captured and stored in the journal file are written in the XDR format which is a binary format standard used across multiple computer architectures. (For information regarding the XDR format, see Sun Microsystems, Inc., Network Programming, revision A May 9, 1988)). The journal file may also be written in ASCII text format for easy portability across different computer systems.

When the toolkit receives the event, at block 550, the application/toolkit responds to the event and submits a request to the window system to perform a task in response to the event. In addition, at block 560, the toolkit determines if the event is one which requires synchronization. If it requires synchronization, at block 570, the toolkit issues a synchronization event which is received by the journaler and stored in the journal file. This process continues until the user session is finished and the capture is complete.

Referring to FIG. 5b, to play back the journal file thereby recreating the user session, the journaler retrieves the first event listed in the journal file and outputs the event to the window system, blocks 600, 610. The event is examined to determine whether the event is a synchronization event, block 620. For each synchronization event, the toolkit, upon notice of completion of processing relevant to the event (the toolkit receives notice that processing is complete in order to return control to the application process), generates a synchronization event which tells the journaler that processing relevant to the synchronization event is complete and the next event in the journal file can be output to the window system. If the event is a synchronization event, at block 630, the journaler waits until a synchronization event is received from the toolkit, indicating that the processing relevant to the synchronization event is complete, prior to proceeding to the next event listed in the journal file. Preferably, to simplify the toolkit, the same mechanism used to generate the synchronization event is used to generate the identical synchronization event which the journaler during replay interprets to indicate that processing is complete with respect to the event. At block 640, if the last event in the journal file has not been reached, the journaler proceeds to the next event in the journal file and continues the process until the last event is reached in the journal file.

Figure 6A:
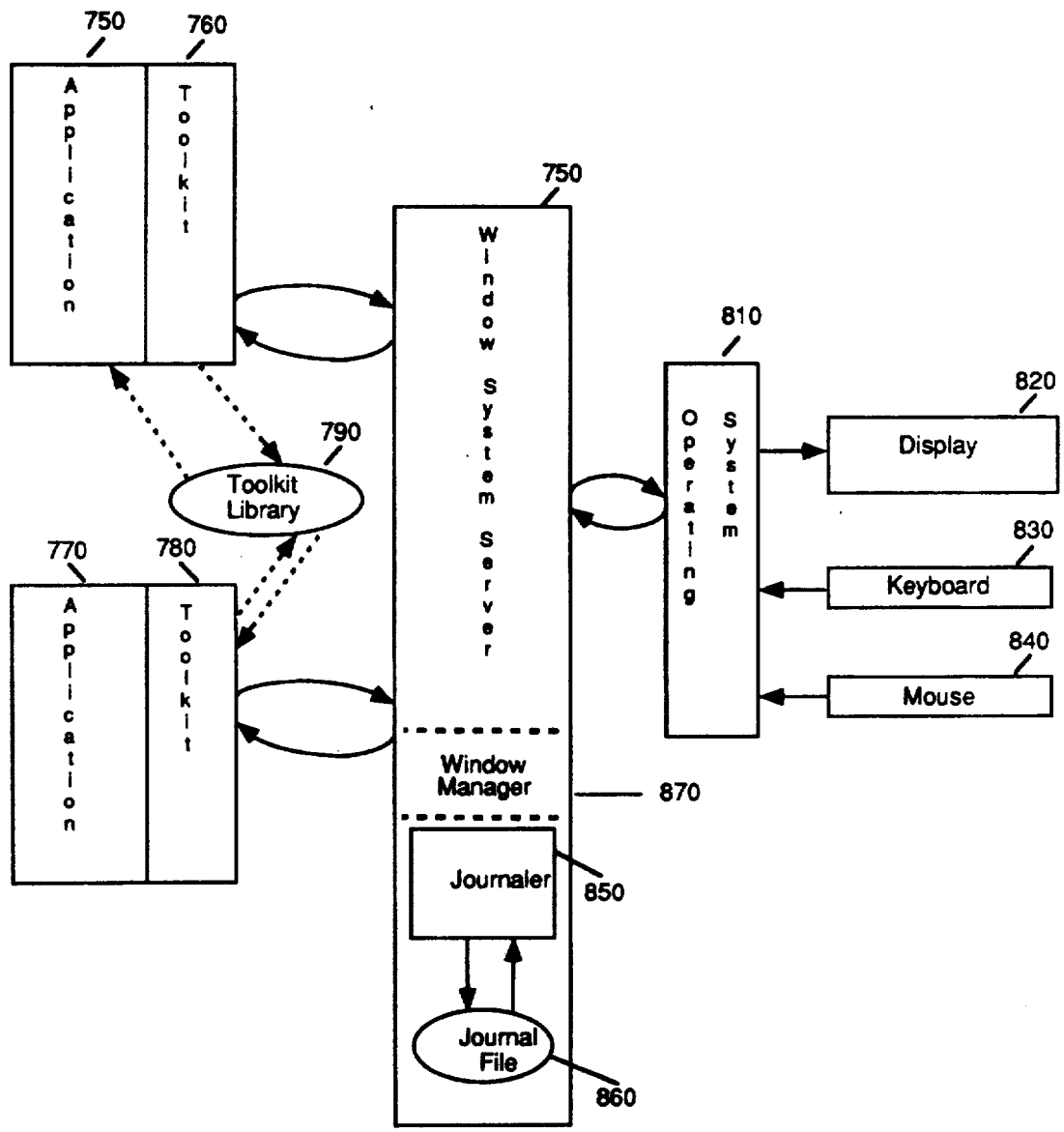
FIGS. 6a and 6b illustrate implementation of the synchronized journaling mechanism of the present invention in a server-based window system.
Figure 6B:
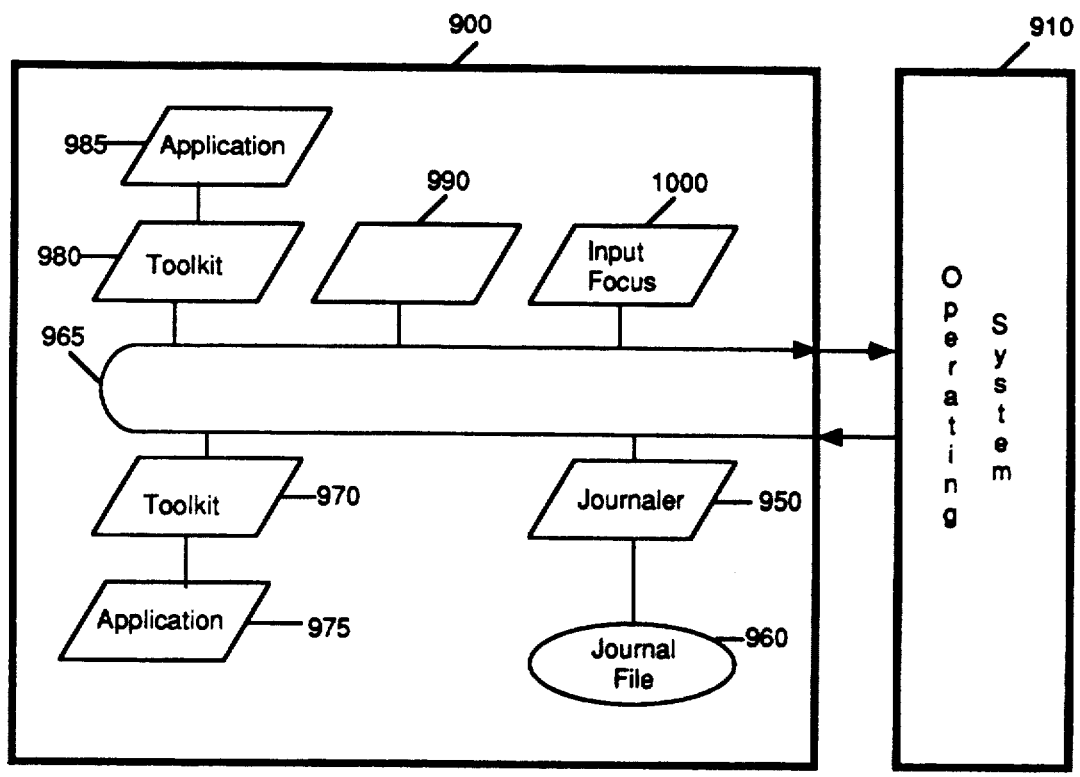

A first embodiment of the synchronized journaling mechanism of the present invention is described as implemented in a server-based window system. As described above, in a server-based window system, the window system is implemented as a plurality of processes, particularly, the window server and window manager. Referring to FIG. 6a, the journaler 850 is incorporated into the window system as an additional process. The processes, referring to FIGS. 6a and 6b, have the ability to access events generated by expressing an interest in certain events. For example, in the X11/NeWs Window System this achieved by executing the command: [event] expressinterest. where event is the name of the event (or events) that an interest is expressed in. To receive the event, the process issues the command: awaitevent [event]. The events output by the operating system 910 are input to bus-like structure (also referred to as a "software bus") which circulates the event among the processes. The event will be accessed by those processes which have expressed interest in the event.

In the synchronized journaling system of the present invention, the journaler process 950 is activated as another process on the server 900. The journaler is set to express an interest in every event such that the journaler receives a copy of every event generated during the user session which is then stored in the journal file 960. As described above, the toolkit of an application will generate a synchronization event when an event (or series of events) is generated which requires synchronization. This event output onto the bus and is also received by the journaler 950 which stores the synchronization event in the journal file 960.

One event that requires synchronization is the change of input focus from one event to the other. Preferably, the change of input focus process 1000 will also generate a synchronization event to be placed in the journal file and will generate on playback a synchronization event when the change of input focus is complete.

Preferably, the journaler is given the highest possible priority such that it is the first to receive events in order to insure that the event is recorded in the journal file before the synchronization event is recorded.

Figure 7:
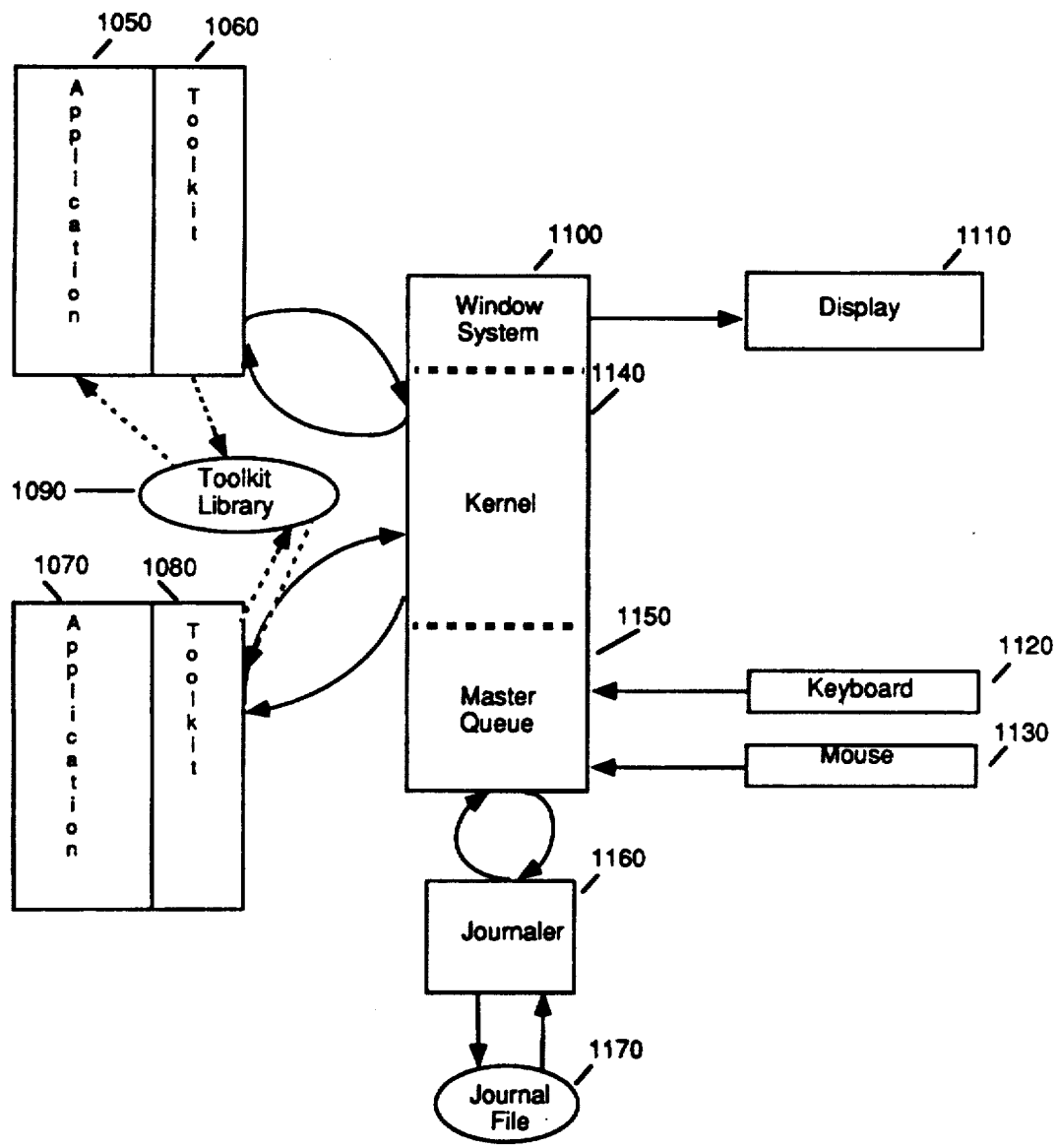
FIG. 7 is a block diagram of the implementation of the synchronized journaling mechanism of the present invention in a kernel-based window system.

FIG. 7 illustrates another embodiment in which the synchronized journaling mechanism of the present invention is implemented in a kernel-based window system. As described earlier, the window system 1100 is part of the kernel 1140. The kernel 1140 monitors the state of the input devices 1120, 1130 and places input received as an event in the master queue 1150 for subsequent execution.

Each event generated is placed in a master queue for subsequent output to the appropriate application. The kernel is modified to cause each event to also be sent to the journaler 1160 which stores the events in the journal file 1170. Each event in the master queue 1150 is sequentially output by the kernel 1140 to the appropriate application 1050, 1070. The toolkit 1060, upon receipt of an event, determines if the event is one which requires synchronization. If the event requires synchronization, a special system call used to communicate synchronization events to the journaler is issued to the kernel 1140 indicating that a synchronization event is required. Upon receipt of the synchronization system call from the toolkit 1060, 1080, the kernel communicates the event to the journaler 1160 which stores the event in the journal file.

The kernel is further modified to include a programmatic interface which permits the journaler 1160 to directly write events into the master queue 1150 through a special system call. To playback the journal file 1170, the journaler 1160 writes events into the master queue 1150 for subsequent execution by the kernel 1190. When a synchronization event is reached, the journaler 1160 will stop writing events to the master queue 1150 until a synchronization event is received by the journaler 1160 indicating that processing is complete. When processing is complete, the toolkit 1060, 1080 sends a synchronization event via a system call, to the kernal 1140 which forwards the synchronization event to the journaler 1160, notifying the journaler that the replay process can continue.

FIG. 8 illustrates a sample journal file in ASCII text format. The event at line 2015 is a synchronization event for an active grab resulting from the events at lines 2000, 2005 and 2010. In this illustration, a synchronization event is identified by the string "/Syngset". During replay, the journaler will not execute the event at line 2020 until execution of the active grab is complete.

While the invention has been described in conjunction with the preferred embodiment, it is evident that numerous alternatives, modifications, variations and uses will be apparent to those skilled in the art in light of the foregoing description.

What is claimed is:

1. In a computer system comprising a central processing unit (CPU), memory, a display, and input/output devices comprising a keyboard and a mouse, said CPU executing at least one process, a synchronized journaling system for testing computer systems, said synchronized journaling system comprising:

means for input of information to the computer system through the input/output devices, said information representative of user actions taken during a user session, said computer system executing processes in response to the information input;

means for generating and storing events in a journal file, representative of the input information representative of user actions, said events during replay being executed;

means for generation and input into the journal file of at least one synchronization event, a first said synchronization event being located between a first event corresponding to a first process and a second event corresponding to a second process, the first process having a corresponding state at completion of execution and the second process being dependent upon the state of the first process at completion of execution of the first process, the second event being dependent upon completion of execution of the first event, said first synchronization event identifying the first event to be completed before executing the second event;

means for replaying the journal file comprising:
means for executing events listed in the journal file in the sequence listed in the journal file,
when a synchronization event is executed, means for halting execution of subsequent events listed in the journal file until the event identified by the synchronization event has completed execution,
wherein during replay of the journal file, the processes are synchronized with a forced sequence such that the second process, dependent upon the state of the first process at completion of execution of the first process, executes after completion of execution of the first process and an accurate test can be performed.

2. The synchronized journaling system as described in claim 1, wherein the computer system comprises a window system and the means for storing events in the journal file comprises:

means for expressing an interest in at least one event representative of the information input to the computer system by the input/output devices, said means for expressing an interest in creating a copy of the at least one event having an interest so expressed; such that a copy of the at least one event is provided to the means for storing events and the events received are stored in the journal file.

3. The synchronized journaling system of claim 1 wherein said computer system further comprises a server-based window system through which the input/output devices communicate with the CPU and application processes execute, said window system comprising a window server, window manager and toolkit, said window server and window manager controlling the display and access to the display by the input/output devices and application processes, said toolkit providing an interface between the application processes and the window system, said window system providing a means to access events input to the window system by expressing an interest in an event, wherein said means for storing events in the journal file is located within the window system such that it has access to events generated by and input through the window system, said means for storing events in the journal file further comprising:

means for expressing an interest in, and creating a copy of, all events generated as a result of user actions to said input/output devices and all synchronization events, whereby the means for storing evetns in the journal file receives a copy of each event generated by the input of information representative of user actions and each synchronization event, each copy of an event received being stored in the journal file.

4. The synchronized journaling system of claim 3 wherein said means for input of synchronization information into the journal file comprises the toolkit, said toolkit further comprising:

means for determining those events which require synchronization; and
means for input of a synchronization event to the window server and window manager when an event which requires synchronization is received by the toolkit;
wherein said window server and window manager provide to the means for storing events in the journal file a copy of the event, said means for storing events in the journal file receiving the copy of the event and storing it in the journal file.

5. The synchronized journaling mechanism as described in claim 3, wherein said means for executing events listed in the journal file comprises means for reading events from the journal file and input of the events to the window system, said window system causing the events to be executed as if the events were received through the input/output devices.

6. The synchronized journaling system of claim 4 further comprising a means for detecting the completion of the event identified in the synchronization event and notifying the means for replaying the journal file that execution of the event identified in the synchronization event has completed execution, said means comprising the toolkit.

7. The synchronized journaling system of claim 1 wherein, said computer system further comprises a kernel-based window system through which the input/output devices communicate with the CPU and application processes execute, said window system located within the kernel and comprises an event manager, window manager and means for storing window state information, said applications interfacing with the window system through a toolkit;

said kernel comprising a master queue into which events are written for subsequent execution, such that events received by the kernel are input to the master queue;
said synchronized journaling system further comprising means for connecting as a device said means for storing events in the journal file to the kernel such that it can communicate information with the kernel;
said kernel further comprising;
means for receiving a command which expresses interest in at least one event and creating a copy of said at least one event; and
means for communicating a copy of events received by the kernel to those devices which express an interest in said at least one event;
wherein if an event is received by the kernel from the input/output devices, a copy of the event received by the kernel from the input/output devices is communicated to the means for storing events in the journal file and the event received is stored in the journal file.

8. The synchronized journaling system of claim 7 wherein said means for input of synchronization information into the journal file comprises:

the toolkit, said toolkit further comprising:
means for determining those events which require synchronization; and
means for input of a synchronization event to the window system when an event which requires synchronization is received by the toolkit; and
means in the kernel to communicate synchronization events received to the means for storing events in the journal file.

9. The synchronized journaling mechanism as described in claim 7, wherein said means for executing events listed in the journal file comprises:

means in the kernel for receiving events from input/output devices other than the input/output devices that would normally generate the events and storing the events in the master queue for subsequent execution;
means for reading events from the journal file and writing the events into the master queue.

10. The synchronized journaling system of claim 7 further comprising a means for notifying the means for replaying the journal file that execution of the event identified in the synchronization event has completed execution, said means comprising:

the toolkit which determines those events which require synchronization and inputs a synchronization event to the kernel when an event which requires synchronization is received by the toolkit; and
the kernel which communicates synchronization events received to the means for inputting the journal file synchronization events.

11. In a computer system comprising a central processing unit (CPU), memory, a display, and input/output devices comprising a keyboard and a mouse, said CPU executing at least one process, a process for synchronized journaling for testing computer systems, said synchronized journaling process comprising the steps of:

input of information to the computer system through the input/output devices, said information representative of user actions taken during a user session, said computer system executing processes in response to the information input;

generating and storing events in a journal file representative of the input information representative of user actions, said events during replay being executed;

generation and input into the journal file of at least one synchronization event, a first said synchronization event being located between a first event corresponding to a first process and a second event corresponding to a second process, the first process having a corresponding state at completion of execution and the second process being dependent upon the state of the first process at completion of execution of the first process, the second event being dependent upon completion of execution of the first event, said first synchronization event identifying the first event to be completed before executing the second event;

replaying the journal file comprising the steps of:
 executing events listed in the journal file in the sequence listed in the journal file,
 when a synchronization event is executed, halting execution of subsequent events listed in the journal file until the event identified by the synchronization event has completed execution, wherein during replay of the journal file, the processes are synchronized with a forced sequence such that the second process, dependent upon the state of the first process at completion of execution of the first process, executes after completion of execution of the first process and an accurate test can be performed.

* * * * *